UNITED STATES PATENT OFFICE.

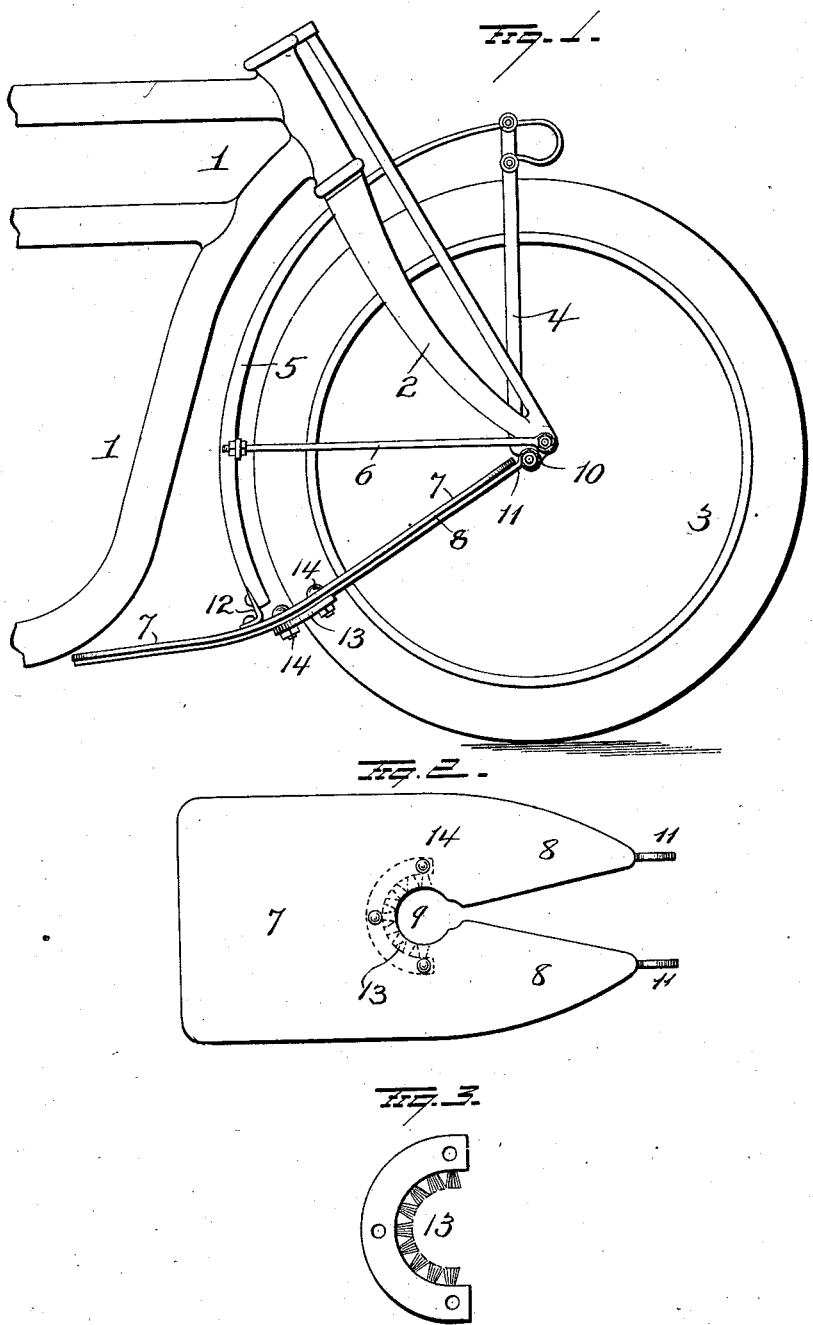

CLAIRE STANTON BARBER, OF WATERVILLE, CONNECTICUT.

GUARD FOR VEHICLES.

1,015,774.  Specification of Letters Patent.  Patented Jan. 30, 1912.

Application filed May 22, 1911. Serial No. 628,801.

*To all whom it may concern:*

Be it known that I, CLAIRE S. BARBER, of Waterville, in the county of New Haven and State of Connecticut, have invented certain new and useful Improvements in Guards for Vehicles; and I do hereby declare the following to be a full, clear, and exact description of the invention, such as will enable others skilled in the art to which it appertains to make and use the same.

This invention relates to improvements in guards for vehicles and more particularly to means for protecting the engine and rider of a motor cycle,—the object of the invention being to provide a simple and efficient device which can be readily attached to any motor cycle and serve effectually to prevent dust and dirt thrown up by the front wheel from becoming lodged on the engine or on the rider.

A further object is to so construct and arrange a guard that when the motor cycle is in motion, an air current will be directed under the engine and serve to carry dust and dirt under and rearwardly of the engine.

With these and other objects in view the invention consists in certain novel features of construction and combinations of parts as hereinafter set forth and pointed out in the claims.

In the accompanying drawings, Figure 1 is a side elevation of a portion of a motor cycle showing an embodiment of my invention, Fig. 2 is a plan view of the guard, detached, and Fig. 3 is a detail view of the brush.

1 represents the forward portion of the cycle frame and 2 the front fork, in which latter the front wheel 3 is mounted. A standard 4 rises from the front fork at each side of the wheel and to these standards, the forward end of a mud guard 5 is attached. This mud guard is substantially concentric with a portion of the periphery of the front wheel and terminates at its lower end appreciably below the longitudinal center of the machine. The lower portion of the mud guard is braced by means of rods 6 secured at their rear ends thereto and at their forward ends to the lower end of the fork 2 or to the axle of the front wheel.

My improvements reside in a guard 7 which extends from the lower end of the fork 2, downwardly and rearwardly past the lower end of the mud guard 5 for the front wheel and terminates at its rear end under the front portion of the machine frame and below the plane of the engine. This guard consists of an apron preferably of leather or other flexible material having the general shape shown in Fig. 2 and provided with forwardly projecting, tapering wings 8. The wings 8 are divergent and at the rear ends of these wings, the apron is made with an approximately circular opening 9. The opening 9 of the guard or apron 7 accommodates the tire of the wheel while the wings 8 are disposed at respective sides of the front wheel and are inclined as shown in Fig. 1 to the lower end of the front fork, where they are loosely connected with said front fork or lugs 10 thereon, by means of metal straps or loops 11.

The rear portion of the guard or apron 7 may be sustained in any desired manner but I find it convenient to secure it to the lower end of the mud guard 5 by means of a suitable angle or bracket 12 as shown in Fig. 1.

A brush 13 is removably secured to apron around the opening 9, by means of suitable fastening devices 14. This brush will closely embrace the tire of the wheel and assist in keeping the dust and dirt down. This brush can be readily replaced with a new one when necessary.

With the guard or apron constructed and applied as above explained and as clearly shown in Fig. 1, it will be apparent that when the machine is in motion an air current will be generated and caused to pass rearwardly under the lower portion of the frame and beneath the engine thereon,—this air current carrying with it such dust and dirt as may be stirred up and thrown back by the front wheel, thus effectually protecting the engine and also the rider.

As the guard fits the rim of the wheel closely, stones, tacks and other sharp objects will be knocked off, and thus be prevented from puncturing the tire.

Having fully described my invention what I claim as new and desire to secure by Letters-Patent, is,—

1. A guard for motor cycles comprising an apron provided with an opening for the accommodation of the tire of the front wheel of the machine and having tapering wings projecting forwardly beyond said opening so as to be disposed at respective sides of the wheel and means at the forward ends of said wings for connecting the apron with the front fork of the machine.

2. The combination with the frame and front wheel of a motor cycle, of a guard consisting of an apron having wings disposed at respective sides of the wheel and connected at their forward ends with the frame adjacent to the axle of the front wheel, said apron extending downwardly and rearwardly from said connection with the frame and terminating at its rear end in a plane below that of the engine.

3. The combination with the frame and front wheel of a motor cycle, of a mud guard supported by the frame and partially embracing said front wheel and a lower guard connected with the frame adjacent to the axle of the front wheel and extending rearwardly and downwardly therefrom, said lower guard terminating at its rear end below the plane of the engine of the machine, and means connecting the rear portion of said lower guard with the lower end of the mud guard.

In testimony whereof, I have signed this specification in the presence of two subscribing witnesses.

CLAIRE STANTON BARBER.

Witnesses:
FRED CHADWICK,
CHAS. O. WILSON.

---

Copies of this patent may be obtained for five cents each, by addressing the "Commissioner of Patents, Washington, D. C."